United States Patent
Odom et al.

(10) Patent No.: US 11,217,811 B2
(45) Date of Patent: Jan. 4, 2022

(54) UNIQUE REDOX-ACTIVE PHENOTHIAZINE COMBINATIONS WITH DEPRESSED MELTING POINTS FOR INCREASED SOLUBILITY AND METHOD OF USE IN ENERGY STORAGE AND IN REDOX FLOW BATTERIES

(71) Applicant: University of Kentucky Research Foundation, Lexington, KY (US)

(72) Inventors: Susan A Odom, Lexington, KY (US); Giorgio Baggi, Lexington, KY (US); Aman Preet Kaur, Lexington, KY (US)

(73) Assignee: University of Kentucky Research Foundation, Lexington, KY (US)

(*) Notice: Subject to any disclaimer, the term of this patent is extended or adjusted under 35 U.S.C. 154(b) by 0 days.

(21) Appl. No.: 16/882,052

(22) Filed: May 22, 2020

(65) Prior Publication Data

US 2020/0373603 A1 Nov. 26, 2020

Related U.S. Application Data

(60) Provisional application No. 62/852,085, filed on May 23, 2019.

(51) Int. Cl.
| | |
|---|---|
| *H01M 8/18* | (2006.01) |
| *H01M 8/08* | (2016.01) |
| *H01M 8/20* | (2006.01) |
| *H01M 8/22* | (2006.01) |
| *C01C 3/12* | (2006.01) |

(52) U.S. Cl.
CPC .............. *H01M 8/188* (2013.01); *C01C 3/12* (2013.01); *H01M 8/08* (2013.01); *H01M 8/20* (2013.01); *H01M 8/222* (2013.01)

(58) Field of Classification Search
CPC .................................................... H01M 8/188
See application file for complete search history.

(56) References Cited

U.S. PATENT DOCUMENTS

| | | | |
|---|---|---|---|
| 2010/0003545 A1* | 1/2010 | Horne | H01M 8/20 429/471 |
| 2014/0051003 A1 | 2/2014 | Esswein et al. | |
| 2017/0062842 A1* | 3/2017 | Huang | C07D 241/46 |

OTHER PUBLICATIONS

Yalkowsky S. H., Wu M., Estimation of the Ideal Solubility (Crystal-Liquid Fugacity Ratio) of Organic Compounds, J. Pharm Sci. 2010, 99 (3), 1100-1106.
Washburn E. W., Read J. W., The Freezing-Point-Solubility Law for Ideal Solutions, Proc. Natl. Acad. Sci. U. S. A. 1915, 1 (4), 191-195.
Mortimer F. S., Melting Point, Latent Heat of Fusion and Solubility, J. Am. Chem. Soc. 1922,44 (7), 1416-1429.
Allen E., The Melting Point of Impure Organic Compounds, J. Chem. Ed. 1942, 19 (6), 278-281.
(Continued)

*Primary Examiner* — Brian R Ohara
(74) *Attorney, Agent, or Firm* — Stites & Harbison PLLC; Mandy Wilson Decker (57) ABSTRACT

A combination of redox active compounds is useful in connection with a rechargeable battery and includes a first redox active compound having a first solubility, and a second redox active compound having a second solubility, wherein the combination has a third solubility that is greater than one or both of the first solubility and the second solubility.

15 Claims, 8 Drawing Sheets

(56) References Cited

OTHER PUBLICATIONS

Bai, Y.; Cao, Y.; Zhang, J.; Wang, M.; Li, R.; Wang, P.; Zakeeruddin, S. M.; Gratzel, M., High-performance dye-sensitized solar cells based on solvent-free electrolytes produced from eutectic melts, Nature Materials 2008, 7, 626-330.

Takechi, K.; Kato, Y.; Hase, Y., A Highly Concentrated Catholyte Based on a Solvate Ionic Liquid for Rechargeable Flow Batteries, Adv. Mater. 2015, 27 (15), 2501-2506.

Wang, Y.; Zhou, H., A green and cost-effective rechargeable battery with high energy density based on a deep eutectic catholyte. Energy Environ Sci. 2016, 9 (7), 2267-2272.

Lesch, V.; Heuer, A.; Rad, B. R.; Winter, M.; Smiatek, Atomistic insights into deep eutectic electrolytes: the influence of urea on the electrolyte salt LiTFSI in view of electrochemical applications, J. Phys. Chem. Chem. Phys. 2016, 18 (41), 28403-28408.

Zhang, C.; Ding, Y.; Zhang, L.; Wang, X.; Zhao, Y.; Zhang, X.; Yu, G. Angew., A Sustainable Redox-Flow Battery with an Aluminum-Based, Deep-Eutectic-Solvent Anolyte, Chem. Int. Ed. 2017, 56 (26), 7454-7459.

Goeltz, J. C.; Matsushima, L. N., Metal-free redox active deep eutectic solvents, ChemComm 2017, 53 (72), 9983-9985.

Zhang, L.; Zhang, C.; Ding, Y.; Ramirez-Meyers, K.; Yu, G., A Low-Cost and High-Energy Hybrid Iron-Muminum Liquid Battery Achieved by Deep Eutectic Solvents, Joule 2017, 1 (3), 623-633.

Zhang, C.; Niu, Z.; Ding, Y.; Zhang, L.; Zhou, Y.; Guo, X.; Zhang, X.; Zhao, Y.; Yu, G., Highly Concentrated Phthalimide-Based Anolytes for Organic Redox Flow Batteries with Enhanced Reversibility, Chem 2018, 4 (12), 2814-2825.

Wang, Y.; Niu, Z.; Zheng, Q.; Zhang, C.; Ye, J.; Dai, G.; Zhao, Y.; Zhang, X., Zn-based eutectic mixture as anolyte for hybrid redox flow batteries, Scientific Reports 2018, 8(1), 5740.

Zhang, C.; Zhang, L.; Ding, Y.; Guo, X.; Yu, G., Eutectic Electrolytes for High-Energy-Density Redox Flow Batteries, ACS Energy Lett. 2018, 3(12), 2875-2883.

Zhang, C.; Qian, Y.; Ding, Y.; Zhang, L.; Guo, X.; Zhao, Y.; Yu, G., Biredox Eutectic Electrolytes Derived from Organic Redox-Active Molecules: High-Energy Storage Systems, Angew. Chem. Int. Ed. 2019, 58(21), 7045-7050.

Lu, J.; Shah, S.; Jo, S.; Majumdar, S.; Gryczke, A.; Kolter, K.; Langley, N.; Repka, M. A., Pharmaceutical Development and Technology, Pharm. Dev. Technol. 2015, 20 (1), 105-117.

Dalal, N.; Buckner, I. S.; Wildfong P. L. D., Experimental Determination and Theoretical Calculation of the Eutectic Composition of Cefuroxime Axetil Diastereomers, AAPS PharmSciTech 2017, 18 (7), 2570-2578.

Meng, F.; Dave, V.; Chauhan, H., Qualitative and quantitative methods to determine miscibility in amorphous drug-polymer systems, Eur J. Pharm. Sci. 2015, 77, 106-111.

Knopp, M. M.; Tajber, L.; Tian, Y.; Olesen, N. E.; Jones, D. S.; Kozyra, A.; Lobmann, K.; Paluch, K.; Brennan, C. M.; Holm, R.; Healy, A. M.; Andrews, G. P.; Rades, T., Comparative Study of Different Methods for the Prediction of Drug-Polymer Solubility, Mol. Pharmaceutics 2015, 12 (9), 3408-3419.

Rask, M. B.; Knopp, M. M.; Olesen, N. E.; Holm, R.; Rades, T., Comparison of two DSC-based methods to predict drug-polymer solubility Int. J. Pharm. 2018, 540 (1-2), 98-105.

\* cited by examiner

UNIQUE REDOX-ACTIVE PHENOTHIAZINE COMBINATIONS WITH DEPRESSED MELTING POINTS FOR INCREASED SOLUBILITY AND METHOD OF USE IN ENERGY STORAGE AND IN REDOX FLOW BATTERIES

RELATED APPLICATIONS

This application claims priority from U.S. Provisional Application Ser. No. 62/852,085 filed May 23, 2019, the entire disclosure of which is incorporated herein by this reference.

GOVERNMENT INTEREST

This invention was made with government support under grant number 1000100147 awarded by the National Science Foundation and grant number 1000600007 awarded by the United States Department of Energy. The government has certain rights in the invention.

TECHNICAL FIELD

The presently-disclosed subject matter generally relates to redox active compound combinations. In particular, certain embodiments of the presently-disclosed subject matter relate to redox active compound combinations of particular ratios of distinct redox active compound compounds having depressed melting points and increased solubility as compared to the redox active compound components of the combinations.

INTRODUCTION

Non-aqueous redox flow batteries have shown great promise, for example, for grid energy storage, due to their independent scaling of power and energy, long operational lifetimes, simple manufacturing, and, when compared to their aqueous counterparts, a wider voltage window and a broader choice of electrochemical couples. Nevertheless, non-aqueous redox flow batteries must operate with high active material concentrations to exhibit high energy densities and simultaneously remain financially viable.

It has been demonstrated that phenothiazine derivatives are valid candidates as posolytes for non-aqueous redox flow batteries, due to the high stability of their radical cations. The systematic chemical modification of the phenothiazine core has allowed for access to an array of compounds with varying solubilities, both in neutral and radical cation state. Despite effort to adopt simple and high-yielding synthetic routes, designing and synthesizing new redox active compounds with improved solubilities is time-demanding, often involving a trial-and-error approach.

SUMMARY

To overcome the burden of the complex discovery processes for obtaining new redox active compounds with improved solubilities, the present inventors have contemplated the use of mixtures of redox active compounds, such as phenothiazines, e.g., binary, ternary, etc. mixtures. With reference to the presently-disclosed subject matter, mixtures of solids can undergo a phenomenon of melting point depression; for example, an "impure" solid exhibits a lower melting point than its pure form. A lower melting point, in turn, is associated with an overall increase in solubility. Thus, a mixture of solids exhibiting a lower melting point than the components of the mixture will also have an overall increase in solubility. Accordingly, as disclosed herein, certain redox active compound combinations are provided as higher-solubility alternatives to the pure constituents of such combinations.

According to the IUPAC definition,[1] solubility is the analytical composition of a saturated solution expressed as a proportion of a designated solute in a designated solvent. For an ideal solution, where the enthalpy of mixing and the volume change on mixing are equal to zero,[2] the solubility only depends on the energy required to break the crystalline lattice of the solute—i.e. the solute has to undergo a "melting" process before the solvent can dissolve its molecules. The ideal solubility depends only on: (i) the enthalpy of fusion of the solute, (ii) the melting point of the solute, and (iii) the experiment temperature.[3] Therefore, to ensure high solubility of an organic molecule, both low melting point and heat of fusion are required.

From a thermodynamic standpoint, the melting of a crystalline material is a first-order phase transition ($\Delta G=0$), which occurs at the temperature where the chemical potentials of the crystal and the melt are equal. The presence of impurities in organic crystalline solids is known to depress the melting point:[4] the enthalpy of fusion exhibits minor differences between pure and impure crystalline solids, while the entropy of fusion is largely influenced by the presence of impurities. Since for a melting process the change in Gibbs free energy of fusion $\Delta G_m = \Delta H_m - T_m \Delta S_m = 0$, the melting point temperature, which can be expressed as $T_m = \Delta H_m / \Delta S_m$, will show a decrease as the entropy of fusion $\Delta S_m$ increases for an impure solid, while the enthalpy of fusion $\Delta H_m$ remains fairly unchanged.

In light of the aforementioned, the correlation between the depression in melting point and an increase in solubility for impure crystalline solids becomes apparent. If the nature and amount of such "impurity" are judiciously controlled, the melting point and, consequently, the solubility of the sample can be tuned. In other words, the solubility of organic crystalline materials in a solvent of choice can be increased by mixing different compounds in various ratio, and such enhancement can be predicted by determining which mixtures exhibit the highest degree of melting point depression.

Accordingly, the presently-disclosed subject matter includes a method of identifying a combination of redox active compounds having enhanced overall solubility, that is, the combination has a greater solubility than the solubility of each of the individual component compounds. In some embodiments, the method involves providing a proposed combination of redox active compounds, determining a melting point of the combination, and identifying the combination as having enhanced overall solubility when the melting point of the combination is lower than the melting point of one or all of the individual redox active compounds in of the combination. The melting point of the combination can be determined using any method known to those skilled in the art. For example, the melting point can be determined using differential scanning calorimetry (DSC).

In some embodiments, when a combination is identified having a lower melting point than the individual redox active compounds of the composition, the method can also involve confirming that the identified combination has an enhanced overall solubility as compared to the individual redox active compounds of the composition.

In some embodiments, the method can also involve providing the proposed combination of redox active compounds in series of different ratios of the individual redox active compounds, and determining a melting point of each ratio, and identifying the ratio of redox active compounds having the greatest reduction in melting point as compared to one or all of the individual redox active compounds in the combination. In this regard, in some embodiments, when a particular ratio is identified as having the greatest reduction in melting point among the combinations including different ratios of the individual redox active compounds, the method can also involve confirming that the identified ratio has an enhanced overall solubility as compared to the other ratios and/or the individual redox active compounds of the composition.

The presently-disclosed subject matter also includes a combination of redox active compounds having a greater solubility than any one of the individual redox active compounds in the combination. Embodiments of the combination include a first redox active compound having a first solubility, and a second redox active compound having a second solubility, wherein the combination of the first and second redox active compounds has a third solubility that is greater than one or both of the first solubility and the second solubility. As will be apparent to the skilled artisan, the first redox active compound and the second redox active compound must be distinct because they have distinct inciting points and solubilities.

In some embodiments, the combination of redox active compounds includes a first redox active compound having a first melting point and a first solubility, and a second redox active compound having a second melting point and a second solubility, wherein the combination has a third melting point that is lower than one or both of the first melting point and the second melting point. In some embodiments the composition also has a third solubility that is greater than one or both of the first solubility and the second solubility.

In some embodiments of the combination, the first redox active compound is a first phenothiazine. In some embodiments of the combination, the second redox active compound is a second phenothiazine.

In some embodiments of the combination, the first redox active compound is selected from N-methylphenothiazine (MPT), N-ethylphenothiazine (EPT), N-phenylphenothiazine (PhPT), N-(2-methoxyethyl)phenothiazine (MEPT), N-(2-(2-methoxyethoxy)-ethyl)phenothiazine (MEEPT), MPT-tetrafluoroborate (MPT-BF$_4$), EPT-tetrafluoroborate (EPT-BF$_4$), PhPT-tetrafluoroborate (PhPT-BF$_4$), MEPT-tetrafluoroborate (MEPT-BF$_4$), MEEPT-tetrafluoroborate (MEEPT-BF$_4$), MPT-bis(trifluoromethanesulfonyl)imide (MPT-TFSI), EPT-bis(trifluoromethanesulfonyl)imide (EPT-TFSI), PhPT-bis(trifluoromethanesulfonyl)imide (PhPT-TFSI), MEPT-bis(trifluoromethanesulfonyl)imide (MEPT-TFSI), and MEEPT-bis(trifluoromethanesulfonyl)imide (MEEPT-TFSI). In some embodiments of the combination, the second redox active compound is selected from the group consisting of: MPT, EPT, PhPT, MEPT, MEEPT, MPT-BF$_4$, EPT-BF$_4$, PhPT-BF$_4$, MEPT-BF$_4$, MEEPT-BF$_4$, MPT-TFSI, EPT-TFSI, PhPT-TFSI, MEPT-TFSI, and MEEPT-TFSI.

In some embodiments, the combination also includes a third redox active compound having a third solubility, wherein the combination has a fourth solubility that is greater than one or all of the first solubility, the second solubility, and the third solubility. In some embodiments, the third redox active compound is selected from the group consisting of: MPT, EPT, PhPT, MEPT, MEEPT, MPT-BF$_4$, EPT-BF$_4$, PhPT-BF$_4$, MEPT-BF$_4$, MEEPT-BF$_4$, MPT-TFSI, EPT-TFSI, PhPT-TFSI, MEPT-TFSI, and MEEPT-TFSI.

In some embodiments of the combination, the individual redox active compounds are provided in a particular ratio. In some embodiments, the first redox active compound and the second redox active compound are provided in a ratio selected from about 4:1, 3:1, 3:2, 7:3, 2:1, 1:1, 1:2, 3:7, 2:3, 1:3, and 1:4.

The presently-disclosed subject matter also includes a positive cell that includes a cathode and a combination of redox active compounds as identified hereinabove, or as identified by a method as described hereinabove.

The presently-disclosed subject matter also includes a rechargeable battery including a combination of redox active compounds as identified hereinabove, or as identified by a method as described hereinabove. In some embodiments, the rechargeable battery includes a high-voltage cathode, an electrolyte comprising a charge-carrying medium and a lithium salt, and a redox shuttle comprising a combination of redox active compounds as identified hereinabove, or as identified by a method as described hereinabove. In some embodiments, the rechargeable battery includes a negative electrode, a positive electrode, and an electrolyte including a combination of redox active compounds as identified hereinabove, or as identified by a method as described hereinabove.

The presently-disclosed subject matter also includes a non-aqueous redox flow battery including a combination of redox active compounds as identified hereinabove, or as identified by a method as described hereinabove. In some embodiments, the non-aqueous redox flow battery includes a negative electrode immersed in a first non-aqueous liquid electrolyte solution, a positive electrode immersed in a second non-aqueous liquid electrolyte solution including a combination of redox active compounds as identified hereinabove, or as identified by a method as described hereinabove, and a semi-permeable separator interposed between the negative and positive electrodes.

In some embodiments of the batteries as disclosed herein, the combination of redox active compounds has a solubility greater than about 0.3 M. In some embodiments, the combination of redox active compounds has a solubility greater than about 0.5 M.

The presently-disclosed subject matter also includes battery arrays. In some embodiments the array includes two or more of the batteries as disclosed herein. In some embodiments, the two or more battery are connected in a series.

The presently-disclosed subject matter also includes a method of making a non-aqueous redox flow battery. In some embodiments, the method involves immersing a negative electrode in a first non-aqueous liquid electrolyte solution, immersing a positive electrode in a second non-aqueous liquid electrolyte solution including a combination of redox active compounds as identified hereinabove, or as identified by a method as described hereinabove, interposing a semi-permeable separator between the negative and positive electrodes.

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this Summary or not. To avoid excessive repetition, this Summary does not list or suggest all possible combinations of such features.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are used, and the accompanying drawings of which:

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

The presently-disclosed subject matter includes methods for predicting combinations and ratios of redox active compounds that exhibit an enhancement in overall solubility by detecting the melting point depression or eutectic melts of the combinations and ratios, as compared to the individual redox active compounds in the combination and/or ratio.

In some embodiments, a method of identifying a combination of redox active compounds having enhanced overall solubility, that is, the combination has a greater solubility than the solubility of each of the individual component compounds. In some embodiments, the method involves providing a proposed combination of redox active compounds, determining a melting point of the combination, and identifying the combination as having enhanced overall solubility when the melting point of the combination is lower than the melting point of one or all of the individual redox active compounds in of the combination. The melting point of the combination can be determined using any method known to those skilled in the art. For example, the melting point can be determined using differential scanning calorimetry (DSC).

In some embodiments, the method can also involve providing the proposed combination of redox active compounds in series of different ratios of the individual redox active compounds, and determining a melting point of each ratio, and identifying the ratio of redox active compounds having the greatest reduction in melting point as compared to one or all of the individual redox active compounds in the combination. In this regard, in some embodiments, when a particular ratio is identified as having the greatest reduction in melting point among the combinations including different ratios of the individual redox active compounds, the method can also involve confirming that the identified ratio has an enhanced overall solubility as compared to the other ratios and/or the individual redox active compounds of the composition.

The presently-disclosed subject matter also includes combinations of redox active compounds useful in connection with energy storage, as redox active materials, and/or in a cell or battery, such as a rechargeable battery and/or a redox flow battery, such as a non-aqueous redox flow battery.

In some embodiments, the combination includes a first redox active compound having a first solubility, and a second redox active compound having a second solubility, wherein the combination of the first and second redox active compounds has a third solubility that is greater than one or both of the first solubility and the second solubility.

In some embodiments, the combination of redox active compounds includes a first redox active compound having a first melting point and a first solubility, and a second redox active compound having a second melting point and a second solubility, wherein the combination has a third melting point that is lower than one or both of the first melting point and the second melting point. In some embodiments the composition also has a third solubility that is greater than one or both of the first solubility and the second solubility.

In some embodiments of the combination, the first redox active compound is a first phenothiazine. In some embodiments of the combination, the second redox active compound is a second phenothiazine.

In some embodiments, the combination of redox active compounds includes a first phenothiazine having a first melting point, and a second phenothiazine having a second melting point, wherein the combination has a third melting point that is lower than one or both of the first melting point and the second melting point. In some embodiments, the combination of redox active compounds includes a first phenothiazine having a first solubility, and a second phenothiazine having a second solubility, wherein the combination has a third solubility that is greater than one or both of the first solubility and the second solubility.

In some embodiments of the combination, the first redox active compound is selected from N-methylphenothiazine (MPT), N-ethylphenothiazine (EPT), N-phenylphenothiazine (PhPT), N-(2-methoxyethyl)phenothiazine (MEPT), N-(2-(2-methoxyethoxy)-ethyl)phenothiazine (MEEPT), MPT-tetrafluoroborate (MPT-$BF_4$), EPT-tetrafluoroborate (EPT-$BF_4$), PhPT-tetrafluoroborate (PhPT-$BF_4$), MEPT-tetrafluoroborate (MEPT-BF$_4$), MEEPT-tetrafluoroborate (MEEPT-BF$_4$), MPT-bis(trifluoromethanesulfonyl)imide (MPT-TFSI), EPT-bis(trifluoromethanesulfonyl)imide (EPT-TFSI), PhPT-bis(trifluoromethanesulfonyl)imide (PhPT-TFSI), MEPT-bis(trifluoromethanesulfonyl)imide (MEPT-TFSI), and MEEPT-bis(trifluoromethanesulfonyl)imide (MEEPT-TFSI). In some embodiments of the combination, the second redox active compound is selected from the group consisting of: MPT, EPT, PhPT, MEPT, MEEPT, MPT-BF4, EPT-BF4, PhPT-BF4, MEPT-BF4, MEEPT-BF4, MPT-TFSI, EPT-TFSI, PhPT-TFSI, MEPT-TFSI, and MEEPT-TFSI. Structures of these exemplary redox active compounds are set forth in FIG. 1.

In some embodiments, the combination also includes a third redox active compound having a third solubility, wherein the combination has a fourth solubility that is greater than one or all of the first solubility, the second solubility, and the third solubility. In some embodiments, the third redox active compound is selected from the group consisting of: MPT, EPT, PhPT, MEPT, MEEPT, MPT-BF$_4$, EPT-BF$_4$, PhPT-BF$_4$, MEPT-BF$_4$, MEEPT-BF$_4$, MPT-TFSI, EPT-TFSI, PhPT-TFSI, MEPT-TFSI, and MEEPT-TFSI.

In some embodiments of the combination, the individual redox active compounds are provided in a particular ratio. In some embodiments, the first redox active compound and the second redox active compound are provided in a ratio selected from about 4:1, 3:1, 3:2, 7:3, 2:1, 1:1, 1:2, 3:7, 2:3, 1:3, and 1:4.

In some embodiments, the combination is identified using a method as disclosed herein.

In some embodiments, the combination has a solubility of about 0.3, 0.4, or 0.5 M or greater. In some embodiments, the compound has a solubility of about 1.0 M or greater. In some embodiments, the compound has a solubility of about 2.0 M or greater. In some embodiments, the compound has a solubility of about 3.0M or greater. In some embodiments, the compound has a solubility of about 4.0 M or greater. In some embodiments, the compound has a solubility of about 5.0 M or greater. In some embodiments, the compound has a solubility in the non-aqueous liquid electrolyte solution of about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 M. The high solubility of the compounds disclosed herein in conjunction with the non-aqueous redox flow battery provides a higher capacity battery that can be used in commercial applications.

The presently-disclosed subject matter also includes methods of using such combinations for energy storage, as redox active materials, and/or in a cell or battery, such as a rechargeable battery and/or a redox flow battery, such as a non-aqueous redox flow battery.

The presently-disclosed subject matter also includes a positive cell that includes a cathode and a combination of redox active compounds as identified hereinabove, or as identified by a method as described hereinabove.

The presently-disclosed subject matter also includes a rechargeable battery including a combination of redox active compounds as identified hereinabove, or as identified by a method as described hereinabove. In some embodiments, the rechargeable battery includes a high-voltage cathode, an electrolyte comprising a charge-carrying medium and a lithium salt, and a redox shuttle comprising a combination of redox active compounds as identified hereinabove, or as identified by a method as described hereinabove. In some embodiments, the rechargeable battery includes a negative electrode, a positive electrode, and an electrolyte including a combination of redox active compounds as identified hereinabove, or as identified by a method as described hereinabove.

As used here, the term "redox shuttle" refers to an electrochemically reversible compound that can become oxidized at a positive electrode of a battery, migrate to a negative electrode of the battery, become reduced at the negative electrode to reform the unoxidized/less-oxidized shuttle species, and migrate back to the positive electrode. A redox shuttle can be an electroactive compound, which can be heterocyclic. A redox shuttle can protect against overcharging.

The term "electrolyte" is well understood to those of ordinary skill in the art and provides a charge-carrying pathway between the negative electrode and the positive electrode. The electrolyte can include a charge-carrying medium and a lithium salt. The electrolyte can also include a redox shuttle.

In some embodiments, a rechargeable battery is provided, which includes a negative electrode; a positive electrode; and an electrolyte comprising a combination of redox active compounds as disclosed herein.

The term "negative electrode" is well understood to those of ordinary skill in the art and refers to one of a pair of electrodes that, under normal circumstances and when the battery/cell is fully charged, has the lowest potential. The negative electrode that can be used in connection with the presently-disclosed subject matter is not particularly limited and can be generally selected from those known in the art, for example, a graphitic anode.

The term "positive electrode" is well understood to those of ordinary skill in the art and refers to one of a pair of electrodes that, under typical circumstances, and when the battery/cell is fully charged, will have the highest potential that it can achieve under normal operation.

The presently-disclosed subject matter also includes a non-aqueous redox flow battery including a combination of redox active compounds as identified hereinabove, or as identified by a method as described hereinabove. In some embodiments, the non-aqueous redox flow battery includes a negative electrode immersed in a first non-aqueous liquid electrolyte solution, a positive electrode immersed in a second non-aqueous liquid electrolyte solution including a combination of redox active compounds as identified hereinabove, or as identified by a method as described hereinabove, and a semi-permeable separator interposed between the negative and positive electrodes.

The presently-disclosed subject matter includes an array comprising two or more of the batteries as disclosed herein. In some embodiments, the array includes two or more battery connected in a series.

The presently-disclosed subject matter further includes methods of making cells and batteries using the combinations of redox active compounds as disclosed herein. In some embodiments, the method of making a non-aqueous redox flow battery involves immersing a negative electrode in a first non-aqueous liquid electrolyte solution; immersing a positive electrode in a second non-aqueous liquid electrolyte solution; interposing a semi-permeable separator between the negative and positive electrodes; wherein the second non-aqueous liquid electrolyte solution comprises a combination of redox active compounds as disclosed herein.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, GenBank sequences, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

Although any methods, devices, and materials similar or equivalent to those described herein can be used in the practice or testing of the presently-disclosed subject matter, representative methods, devices, and materials are described herein.

The present application can "comprise" (open ended) or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, in some embodiments ±0.1%, in some embodiments ±0.01%, and in some embodiments ±0.001% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

The presently-disclosed subject matter is further illustrated by the following specific but non-limiting examples. The following examples may include compilations of data that are representative of data gathered at various times during the course of development and experimentation related to the present invention.

EXAMPLES

Figure 1:
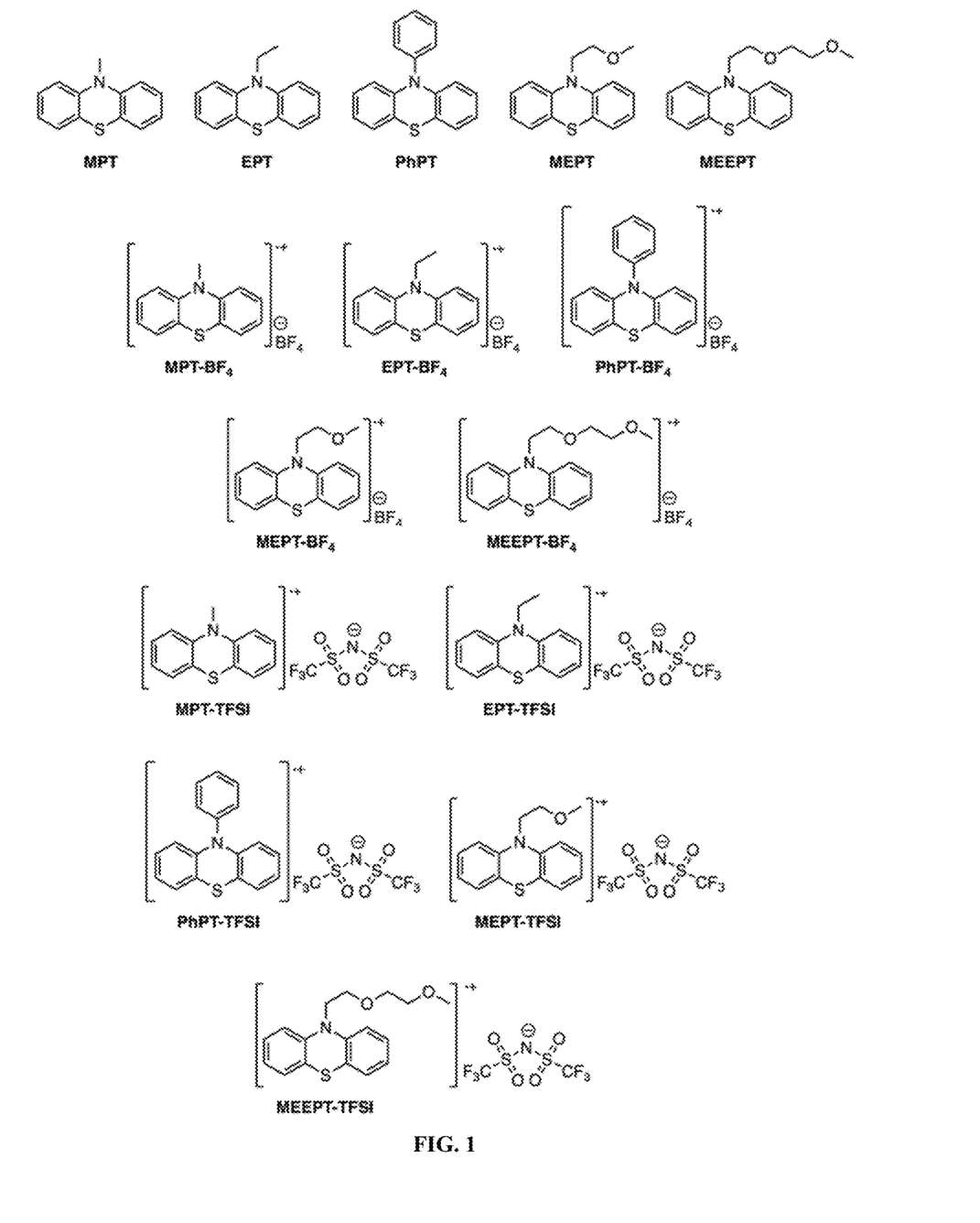
FIG. 1 includes an exemplary set of redox active compounds, which include N-methylphenothiazine (MPT), N-ethylphenothiazine (EPT), N-phenylphenothiazine (PhPT), N-(2-methoxyethyl)phenothiazine (MEPT), N-(2-(2-methoxyethoxy)-ethyl)phenothiazine (MEEPT), MPT-tetrafluoroborate (MPT-$BF_4$), EPT-tetrafluoroborate (EPT-$BF_4$), PhPT-tetrafluoroborate (PhPT-$BF_4$), MEPT-tetrafluoroborate (MEPT-$BF_4$), MEEPT-tetrafluoroborate (MEEPT-$BF_4$), MPT-bis(trifluoromethanesulfonyl)imide (MPT-TFSI), EPT-bis(trifluoromethanesulfonyl)imide (EPT-TFSI), PhPT-bis(trifluoromethanesulfonyl)imide (PhPT-TFSI), MEPT-bis(trifluoromethanesulfonyl)imide (MEPT-TFSI), and MEEPT-bis(trifluoromethanesulfonyl)imide (MEEPT-TFSI).

Blends of redox active compounds in different ratios were screened to identify matching pairs exhibiting a significant depression of melting point, and such blends were selected for further solubility studies in acetonitrile. An initial testing set was chosen, composed of five (5) redox active compounds (MPT, EPT, PhPT, MEPT, MEEPT) with similar oxidation potential to screen and identify the blends where a decrease in melting point is observed; four (2) of the corresponding $BF_4$ radical cation salts (MPT-$BF_4$, EPT-$BF_4$, PhPT-$BF_4$, MEPT-$BF_4$) and three (3) of the TFSI radical cation salts (MPT-TFSI, EPT-TFSI, PhPT-TFSI) were also tested. All of these compounds are depicted in FIG. 1.

Figure 2:
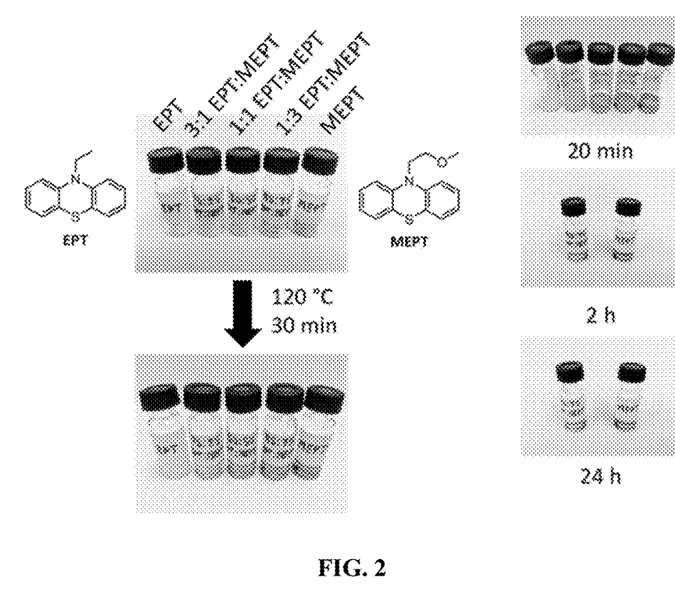
FIG. 2 depicts results of a visual melting point depression test on various EPT-MEPT mixtures.

Visual melting point depression tests were initially performed, where variable ratios of two redox active compounds were mixed, melted in an oven at 120° C. for 30 minutes to ensure complete homogeneity of the mixtures, and let to sit at room temperature. FIG. 2 shows the outcome of this experiment for the mixture of EPT and MEPT. Mixtures with high ratios of EPT were observed to solidify within 20 minutes, while mixtures high in MEPT remained liquid indefinitely.

The solubility of each of such mixtures was determined according to the following procedure: acetonitrile was added to the vials containing the samples in aliquots ranging from 0.1 to 1 mL; after every aliquot of solvent was added, each sample was shaken, sonicated, and lightly warmed up with a heat gun (about 40° C.); if the suspended solid persisted, another aliquot was added, and the process repeated until a clear solution was obtained. The warm solution was left to cool down to room temperature: if any solid formed, more solvent was added, and the process repeated until the solution remained clear indefinitely. The solubility was then determined using $^1H$ NMR spectroscopy. Since MEPT is miscible in acetonitrile in all ratios, the solubility of EPT alone was only compared, [EPT]=0.11 mol/L, with the new solubility of EPT achieved when mixed with MEPT. The results are summarized in Table 1: in both the cases examined, the solubility of EPT increased substantially when mixed with MEPT.

TABLE 1

Solubility of EPT in acetonitrile when mixed with MEPT in variable ratios.

| EPT:MEPT w/w | $\chi$EPT | New [EPT] (mol/L) | EPT solubility enhancement |
|---|---|---|---|
| 1:1 | 0.53 | 0.35 | x3.2 |
| 1:3 | 0.23 | 0.29 | x2.6 |

The solubility of mixtures of the corresponding radical cations, EPT-BF$_4$ and MEPT-BF$_4$, were also tested by following the procedure above: in all cases, an overall increase of total phenothiazine radical cation solubility was observed when compared to the single components of the mixture, [EPT-BF$_4$]=0.33 mol/L and [MEPT-BF$_4$]=0.31 mol/L.

TABLE 2

Total solubility of xPT-BF$_4$ in ACN for variable ratios of the mixture EPT-BF$_4$-MEPT-BF$_4$

| EPT-BF$_4$:MEPT-BF$_4$ mol/mol | [EPT-BF$_4$] (mol/L) | [MEPT-BF$_4$] (mol/L) | Total [xPT-BF$_4$] (mol/L) |
|---|---|---|---|
| 3:1 | 0.45 | 0.15 | 0.60 |
| 1:1 | 0.50 | 0.50 | 1.00 |
| 1:3 | 0.19 | 0.56 | 0.75 |

Figure 3:
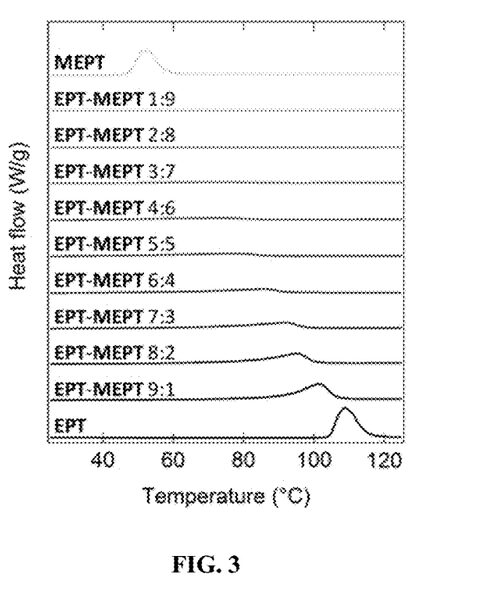
FIG. 3 includes results of differential scanning calorimetry (DSC) analysis of various EPT-MEPT mixtures.

To correlate these observations regarding melting point depression and solubility, mixtures of EPT and MEPT were submitted to differential scanning calorimetry (DSC) analysis (FIG. 3). Melting points of pure redox active compounds and their mixtures corresponded to the onset point of the endothermic melting peak, which is independent from sample size and scan rate. Homogenous blending of the mixtures was ensured by melting the samples beforehand in an oven at 120° C. for 30 minutes and letting them cool to room temperature.

The mixtures of EPT (m.p.=104.5° C.) and MEPT (m.p.=47.3° C.) displayed a peculiar behavior, because MEPT was found to undergo an irreversible solid to liquid transition and exists indefinitely as a stable viscous oil, which can act as a solvent for EPT. This complicated the analysis, since the procedure followed to prepare the mixtures generated homogeneous solutions of EPT in MEPT when the latter constituted more than 70% of the mixture. In conclusion, a definite melting point depression for this pair of redox active compounds was not observed.

Figure 4:
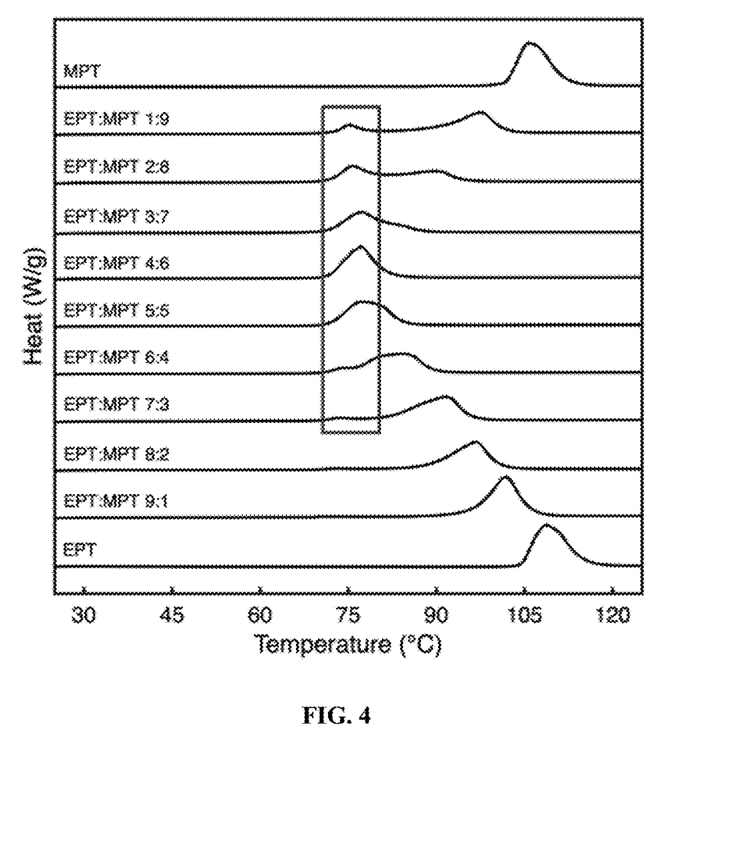
FIG. 4 includes results of DSC analysis of various EPT-MPT mixtures.

The thermal analysis results changed consistently for other mixtures of redox active compounds, such as EPT (m.p.=104.5° C.) and MPT (m.p.=101.8° C.). The DSC analysis represented in FIG. 4 shows that these mixtures not only exhibited melting point depression, as shown by the shifting of the corresponding endothermic melting peaks to lower temperatures, but they also displayed the emergence of a new peak at constant temperature, highlighted by the blue box in the figure: this endothermic peak was attributed to an eutectic melt process with a melting point of 71.6° C.

Since the EPT-MPT eutectic mixture displayed the lowest achievable melting point for this pair of redox active compounds, the corresponding EPT:MPT molar ratio of 4:6 was selected, as determined by careful analysis of the DSC scans, for subsequent solubility determination in acetonitrile (Table 3): the total solubility of phenothiazine, [xPT]=0.46 mol/L, for this mixture resulted to be higher than both solubilities of the single components, [EPT]=0.11 mol/L and [MPT]=0.24 mol/L.

TABLE 3

Solubilities of EPT and MPT, and total solubility of EPT-MPT 1:2 in acetonitrile.

| EPT:MPT mol/mol | [EPT] (mol/L) | [MPT] (mol/L) | Total [xPT] (mol/L) |
|---|---|---|---|
| 4:6 | 0.17 | 0.28 | 0.46 |

Figure 5A:
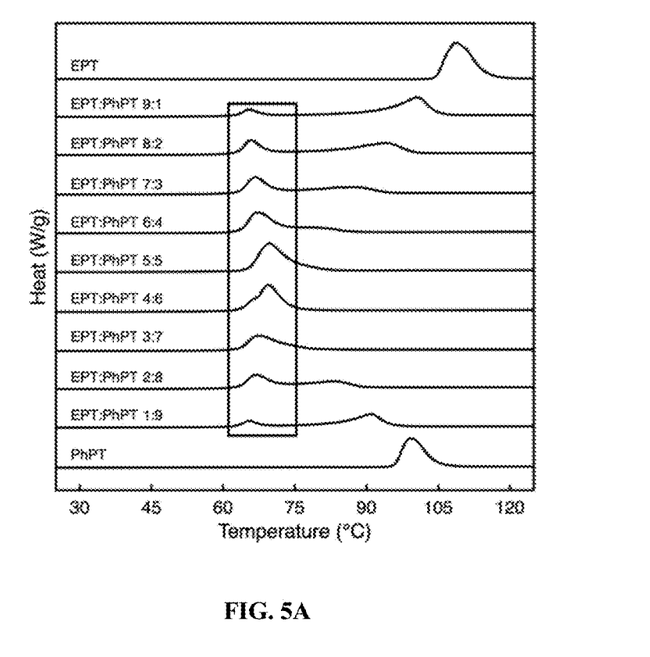
FIGS. 5A and 5B include results of DSC analysis of various EPT-PhPT and MPT-PhPT mixtures.
Figure 5B:
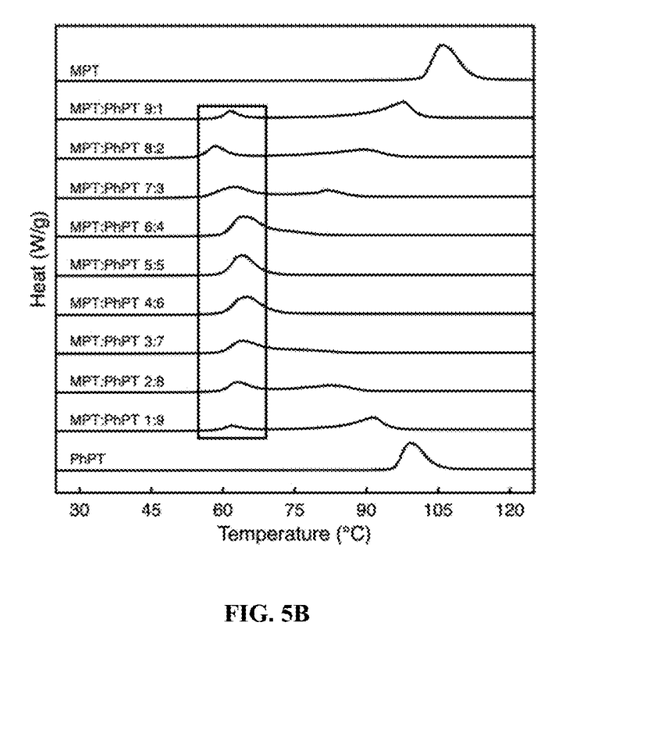

Analogous results (FIG. 5) were obtained for mixtures of EPT (m.p.=104.5° C.) and PhPT (m.p.=96.0° C.): a similar eutectic melt process (m.p.=65.4° C.) was observed, and the eutectic mixture exhibited a 1:1 EPT:PhPT molar ratio and also for mixtures of MPT (m.p.=101.8° C.) and PhPT (m.p.=96.0° C.): a eutectic melt process (m.p.=60.3° C.) was observed, which also exhibited a 1:1 MPT:PhPT molar ratio.

The total solubility for EPT-PhPT 1:1 eutectic mixture, [xPT]=0.94 mol/L, showed an even higher improvement (Table 4) when compared to the solubilities of the single components, [EPT]=0.11 mol/L and [PhPT]=0.14 mol/L. Similarly, the total solubility for MPT-PhPT 1:1 eutectic mixture, [xPT]=0.95 mol/L, showed improvement (Table 5) when compared to the solubilities of the single components, [MPT]=0.24 mol/L and [PhPT]=0.14 mol/L.

TABLE 4

Solubilities of EPT and PhPT, and total solubility of EPT-PhPT 1:2 in acetonitrile.

| EPT:PhPT mol/mol | [EPT] (mol/L) | [PhPT] (mol/L) | Total [xPT] (mol/L) |
|---|---|---|---|
| 1:1 | 0.49 | 0.47 | 0.94 |

TABLE 5

Solubilities of MPT and PhPT, and total solubility of EPT-PhPT 1:2 in acetonitrile.

| MPT:PhPT mol/mol | [MPT] (mol/L) | [PhPT] (mol/L) | Total [xPT] (mol/L) |
|---|---|---|---|
| 1:1 | 0.47 | 0.49 | 0.95 |

To correlate regarding melting point depression and solubility for corresponding radical cation salts, mixtures of EPT-TFSI and MPT-TFSI were submitted to DSC analysis (FIG. 6), since the BF$_4$ salts does not show melting point before decomposition. Homogenous blending of the mixtures was ensured by mixing of salts using pestle mortar.

Figure 6:
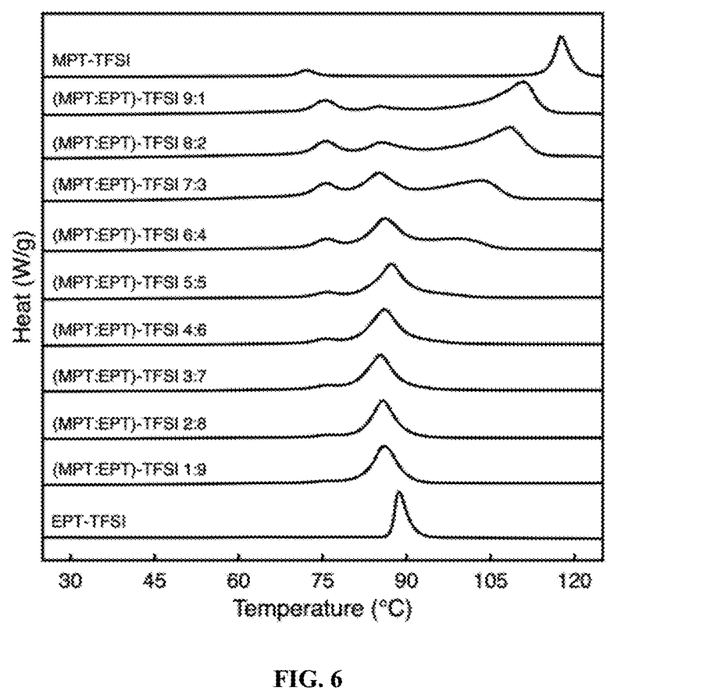
FIG. 6 includes results of DSC analysis of various EPT-TFSI and MPT-TFSI mixtures.

The DSC analysis represented in FIG. 6 shows that the mixture not only exhibited melting point depression, as shown by the shifting of the corresponding endothermic melting peaks to lower temperatures, but they also displayed the emergence of a new peak at constant temperature, highlighted by the blue box in the figure: this endothermic peak was attributed to an eutectic melt process with a melting point of 80.2° C. (Table 6).

Figure 7A:
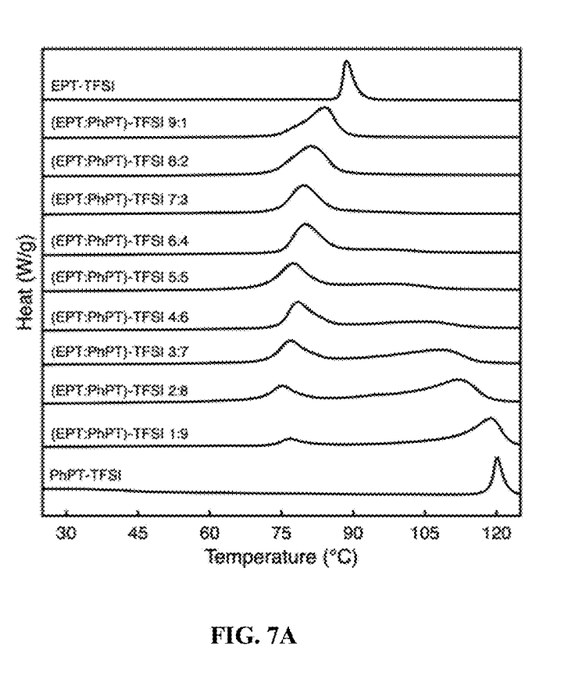
FIGS. 7A and 7B include results of DSC analysis of various EPT-TFSI and PhPT-TFSI, and MPT-TFSI and PhPT-TFSI mixtures.
Figure 7B:
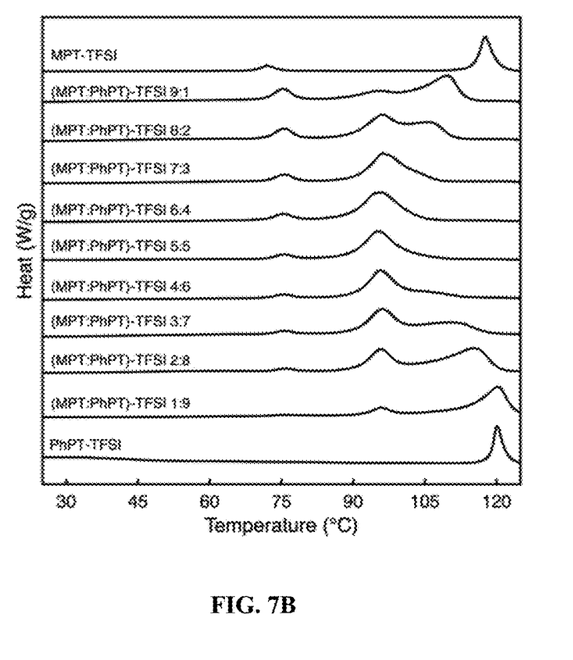

Analogous results (FIG. 7, Table 6) were obtained for mixtures of EPT-TFSI and PhPT-TFSI (eutectic melt process 72.8° C.) and MPT-TFSI and PhPT-TFSI (eutectic melt process 88.9° C.).

The total solubility for these eutectic mixtures showed improvement (Table 6) when compared to the solubilities of the single components.

TABLE 6

Melting point and solubilities (in acetonitrile) of RPT-TFSI and the corresponding binary blend.

| Compound/mixture | Melting point (° C.) | Solubility (mol/L) |
|---|---|---|
| MPT-TFSI | (69.4) 115.4 | 1.50 |
| EPT-TFSI | 87.3 | 0.37 |
| PhPT-TFSI | 118.6 | 1.64 |

TABLE 6-continued

Melting point and solubilities (in acetonitrile) of RPT-TFSI and the corresponding binary blend.

| Compound/mixture | Melting point (° C.) | Solubility (mol/L) |
|---|---|---|
| MPT-TFSI - EPT-TFSI 3:7 | 80.2 | 2.30 |
| MPT-TFSI - PhPT-TFSI 6:4 | 88.9 | 2.09 |
| EPT-TFSI - PhPT-TFSI 8:2 | 72.8 | 2.17 |

Ternary blend of neutral and charged RPT's also showed improvement (Table 7) when compared to the solubilities of the single components.

TABLE 7

Solubilities (in acetonitrile) of RPT's ternary blend of 1:1:1 molar ratio in neutral and charged form.

| Mixture | Solubility (mol/L) |
|---|---|
| (M—E—Ph)PT 1:1:1 | 1.03 |
| (M—E—Ph)PT-BF$_4$ 1:1:1 | 0.42 |
| (M—E—Ph)PT-TFSI 1:1:1 | 1.86 |

Figure 8A:
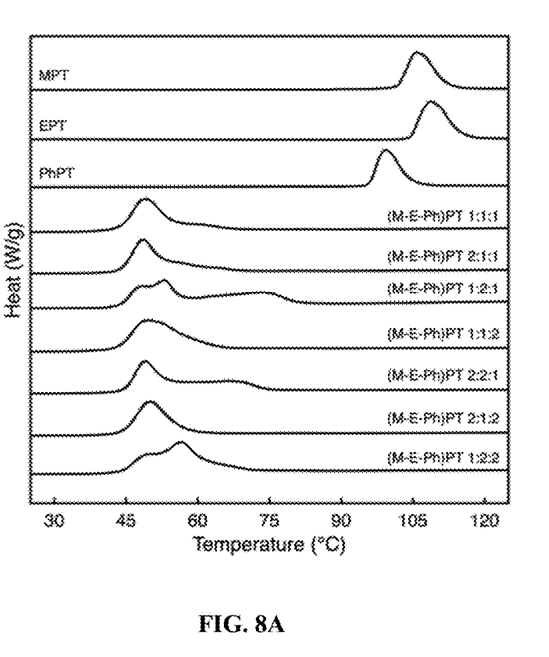
FIGS. 8A and 8B include results of DSC analysis of various ternary mixtures, including MPT-EPT-PhPT, MPT-$BF_4$-EPT-$BF_4$-PhPT-$BF_4$, and MPT-TFSI-EPT-TFSI-PhPT-TFSI.
Figure 8B:
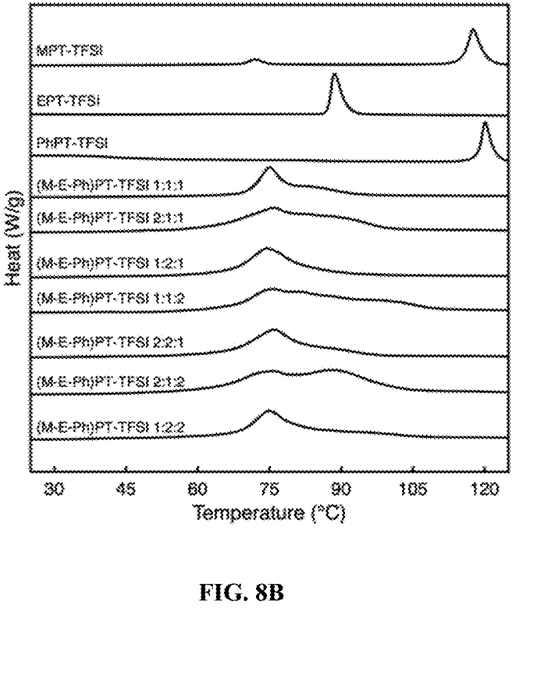

The DSC analysis represented in FIG. 8 shows that these ternary mixtures exhibited melting point depression.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

1. IUPAC. Compendium of Chemical Terminology, 2nd ed. (the "Gold Book"). Compiled by A. D. McNaught and A. Wilkinson. Blackwell Scientific Publications, Oxford (1997)
2. Yalkowsky S. H., Wu M. *J. Pharm. Sci.* 2010, 99 (3), 1100-1106.
3. (a) Washburn E. W., Read J. W. *Proc. Natl. Acad. Sci. U. S. A.* 1915, 1 (4), 191-195; (b) Mortimer F. S. *J. Am. Chem. Soc.* 1922, 44 (7), 1416-1429.
4. Allen E. *J. Chem. Ed.* 1942, 19 (6), 278-281.
5. Esswein, A. J.; Goelts, J.; Amadeo, D. High Solubility Iron Hexacyanides. U.S. Patent Application Publication No. 2014/0051003 A1, Feb. 20, 2014.
6. Bai, Y.; Cao, Y.; Zhang, J.; Wang, M.; Li, R.; Wang, P.; Zakeeruddin, S. M.; Grätzel, M. *Nature Materials* 2008, 7, 626-630.
7. Takechi, K.; Kato, Y.; Hase, Y. *Adv. Mater.* 2015, 27 (15), 2501-2506.
8. Wang, Y.; Zhou, H. *Energy Environ. Sci.* 2016, 9 (7), 2267-2272.
9. Lesch, V.; Heuer, A.; Rad, B. R.; Winter, M.; Smiatek, J. *Phys. Chem. Chem. Phys.* 2016, 18 (41), 28403-28408.
10. Zhang, C.; Ding, Y.; Zhang, L.; Wang, X.; Zhao, Y.; Zhang, X.; Yu, G. *Angew. Chem. Int. Ed.* 2017, 56 (26), 7454-7459.
11. Goeltz, J. C.; Matsushima, L. N. *Chem Comm* 2017, 53 (72), 9983-9985.
12. Zhang, L.; Zhang, C.; Ding, Y.; Ramirez-Meyers, K.; Yu, G. *Joule* 2017, 1 (3), 623-633.
13. Zhang, C.; Niu, Z.; Ding, Y.; Zhang, L.; Zhou, Y.; Guo, X.; Zhang, X.; Zhao, Y.; Yu, G. *Chem* 2018, 4 (12), 2814-2825.
14. Wang, Y.; Niu, Z.; Zheng, Q.; Zhang, C.; Ye, J.; Dai, G.; Zhao, Y.; Zhang, X. *Scientific Reports* 2018, 8 (1), 5740.
15. Zhang, C.; Zhang, L.; Ding, Y.; Guo, X.; Yu, G. *ACS Energy Lett.* 2018, 3(12), 2875-2883.
16. Zhang, C.; Qian, Y.; Ding, Y.; Zhang, L.; Guo, X.; Zhao, Y.; Yu, G. *Angew. Chem. Int. Ed.* 2019, 58(21), 7045-7050.
17. Lu, J.; Shah, S.; Jo, S.; Majumdar, S.; Gryczke, A.; Kolter, K.; Langley, N.; Repka, M. A. *Pharm. Dev. Technol.* 2015, 20 (1), 105-117.
18. Dalal, N.; Buckner, I. S.; Wildfong P. L. D. *AAPS Pharm Sci Tech* 2017, 18 (7), 2570-2578.
19. Meng, F.; Dave, V.; Chauhan, H. *Eur. J, Pharm. Sci.* 2015, 77, 106-111.
20. Knopp, M. M.; Tajber, L.; Tian, Y.; Olesen, N. E.; Jones, D. S.; Kozyra, A.; Löbmann, K.; Paluch, K.; Brennan, C. M.; Holm, R.; Healy, A. M.; Andrews, G. P.; Rades, T. *Mol. Pharmaceutics* 2015, 12 (9), 3408-3419.
21. Rask, M. B.; Knopp, M. M.; Olesen, N. E.; Holm, R.; Rades, T. *Int. J. Pharm.* 2018, 540 (1-2), 98-105.

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A combination of redox active compounds, comprising:
a first redox active compound having a first solubility and a first melting point, and
a second redox active compound having a second solubility and a second melting point,
wherein the first redox active compound and the second redox active compound are in a ratio selected from the group of ratios consisting of about 4:1, 3:1, 3:2, 7:3, 2:1, 1:1, 1:2, 3:7, 2:3, 1:3, and 1:4, and
wherein the selection of the first redox active compound, the selection of the second redox active compound, and the selection of the ratio provide for the combination having a third solubility that is greater than one or both of the first solubility and the second solubility.

2. The combination of claim 1, wherein the first redox active compound is a first phenothiazine, and the second redox active compound is a second phenothiazine.

3. The combination of claim 1, wherein the first redox active compound is selected from the group consisting of: methyl phenothiazine (MPT), ethyl phenothiazine (EPT), phenylphenothiazine (PhPT), methoxyethyl-phenothiazine (MEPT), methoxyethoxy-ethyl-phenothiazine (MEEPT), MPT-tetrafluoroborate (MPT-BF$_4$), EPT-tetrafluoroborate (EPT-BF$_4$), PhPT-tetrafluoroborate (PhPT-BF$_4$), MEPT-tetrafluoroborate (MEPT-BF$_4$), MEEPT-tetrafluoroborate (MEEPT-BF$_4$), MPT-bis(trifluoromethanesulfonyl)imide (MPT-TFSI), EPT-bis(trifluoromethanesulfonyl)imide (EPT-TFSI), PhPT-bis(trifluoromethanesulfonyl)imide (PhPT-TFSI), MEPT-bis(trifluoromethanesulfonyl)imide (MEPT-TF SI), and MEEPT-bis(trifluoromethanesulfonyl) imide (MEEPT-TF SI).

4. The combination of claim 3, wherein the second redox active compound is selected from the group consisting of: MPT, EPT, PhPT, MEPT, MEEPT, MPT-BF$_4$, EPT-BF$_4$, PhPT-BF$_4$, MEPT-BF$_4$, MEEPT-BF$_4$, MPT-TFSI, EPT-TFSI, PhPT-TFSI, MEPT-TFSI, and MEEPT-TF SI.

5. The combination of claim 4, and further including a third redox active compound having a third solubility, wherein the combination has a fourth solubility that is greater than one or all of the first solubility, the second solubility, and the third solubility.

6. The combination of claim 5, wherein the third redox active compound is selected from the group consisting of: MPT, EPT, PhPT, MEPT, MEEPT, MPT-BF$_4$, EPT-BF$_4$, PhPT-BF$_4$, MEPT-BF$_4$, MEEPT-BF$_4$, MPT-TFSI, EPT-TFSI, PhPT-TFSI, MEPT-TFSI, and MEEPT-TFSI.

7. The combination of claim 1, and further including a third redox active compound having a third solubility, wherein the combination has a fourth solubility that is greater than one or all of the first solubility, the second solubility, and the third solubility.

8. A positive cell comprising a cathode and the combination of redox active compounds according to claim 1.

9. A rechargeable battery comprising:
a high-voltage cathode;
an electrolyte comprising a charge-carrying medium and a lithium salt;
a redox shuttle comprising the combination of redox active compounds according to claim 1.

10. A rechargeable battery comprising:
a negative electrode;
a positive electrode; and
an electrolyte comprising the combination of redox active compounds according to claim 1.

11. A non-aqueous redox flow battery comprising:
a negative electrode immersed in a first non-aqueous liquid electrolyte solution;
a positive electrode immersed in a second non-aqueous liquid electrolyte solution, the second non-aqueous liquid electrolyte solution including the combination of redox active compounds according to claim 1; and
a semi-permeable separator interposed between the negative and positive electrodes.

12. The battery of claim 1, wherein the combination has a solubility greater than about 0.3 M.

13. The battery of claim 1, wherein the combination has a solubility greater than about 0.5 M.

14. An array comprising two or more of the batteries of claim 11.

15. The array of claim 14, wherein the two or more battery are connected in a series.

* * * * *